US010733223B2

(12) United States Patent
Schinkelwitz

(10) Patent No.: US 10,733,223 B2
(45) Date of Patent: Aug. 4, 2020

(54) TERM-DRIVEN RECORDS FILE PLAN AND THESAURUS DESIGN

(75) Inventor: Bruce Schinkelwitz, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 1262 days.

(21) Appl. No.: 11/970,831

(22) Filed: Jan. 8, 2008

(65) Prior Publication Data

US 2009/0177668 A1   Jul. 9, 2009

(51) Int. Cl.
*G06F 17/21* (2006.01)
*G06F 16/36* (2019.01)
*G06F 16/20* (2019.01)

(52) U.S. Cl.
CPC .............. *G06F 16/36* (2019.01); *G06F 16/20* (2019.01)

(58) Field of Classification Search
CPC .............. G06N 7/005; G06F 17/30684; G06F 17/30595; G06F 17/30613; G06F 16/20
USPC ......... 704/1–10; 707/999.007, 100, E17.001
See application file for complete search history.

(56) References Cited

U.S. PATENT DOCUMENTS

| | | | | |
|---|---|---|---|---|
| 5,926,811 A * | 7/1999 | Miller et al. | ................... | 707/748 |
| 6,385,619 B1 * | 5/2002 | Eichstaedt | ........ | G06F 17/30867 |
| | | | | 707/748 |
| 6,446,061 B1 * | 9/2002 | Doerre | ................ | G06F 17/3071 |
| | | | | 707/738 |
| 6,625,619 B1 * | 9/2003 | McClendon | ...... | G06F 17/30873 |
| 6,665,681 B1 * | 12/2003 | Vogel | .................. | G06F 17/3071 |
| | | | | 707/738 |
| 6,678,692 B1 * | 1/2004 | Hyatt | .................. | G06F 17/3071 |
| | | | | 707/758 |
| 6,701,314 B1 * | 3/2004 | Conover | ........... | G06F 17/30707 |
| | | | | 707/740 |
| 6,711,563 B1 * | 3/2004 | Koskas | ............. | G06F 17/30324 |
| | | | | 707/600 |
| 6,711,585 B1 * | 3/2004 | Copperman | ...... | G06F 17/30616 |
| 6,816,868 B1 * | 11/2004 | Shimizu | | |
| 6,898,586 B1 | 5/2005 | Hlava et al. | | |
| 7,003,442 B1 * | 2/2006 | Tsuda | ................................ | 704/9 |
| 7,047,486 B1 * | 5/2006 | Nagao | ............... | G06F 17/30707 |
| | | | | 707/999.006 |

(Continued)

FOREIGN PATENT DOCUMENTS

EP   1160715 A2   12/2001
JP   05094482 A2   4/1993

(Continued)

*Primary Examiner* — Michael Ortiz-Sanchez
(74) *Attorney, Agent, or Firm* — Mollborn Patents, Inc.; Fredrik Mollborn

(57) ABSTRACT

Methods and apparatus, including computer program products, implementing and using techniques for generating a file plan and a thesaurus for a records management system. A first user input defining one or more top level terms to be used in the file plan is received. A second user input defining one or more child level terms to be used in the file plan for at least some of the top level terms is received. A third user input defining one or more term relationships among the collection of child level terms and the top level terms is received. Without further user input, a file plan and a thesaurus are generated based on the top level terms, the child level terms and the specified term relationships among the child level terms and top level terms.

21 Claims, 2 Drawing Sheets

(56) References Cited

U.S. PATENT DOCUMENTS

| | | | |
|---|---|---|---|
| 7,076,484 B2 | 7/2006 | Dworkis et al. | |
| 7,162,465 B2* | 1/2007 | Jenssen et al. | |
| 7,181,438 B1* | 2/2007 | Szabo | G06F 17/30522 |
| 7,194,483 B1 | 3/2007 | Mohan et al. | |
| 7,231,379 B2 | 6/2007 | Parikh et al. | |
| 7,516,063 B1* | 4/2009 | Harvey et al. | 704/10 |
| 7,693,859 B2* | 4/2010 | Borthakur | G06F 7/02 |
| | | | 707/999.101 |
| 7,734,638 B2* | 6/2010 | Shimizu et al. | 707/758 |
| 8,086,608 B2* | 12/2011 | Hampton | 707/737 |
| 8,452,787 B2* | 5/2013 | Jonas | G06F 16/20 |
| | | | 707/758 |
| 8,620,937 B2* | 12/2013 | Jonas | G06F 16/283 |
| | | | 707/758 |
| 2002/0107853 A1* | 8/2002 | Hofmann et al. | 707/7 |
| 2002/0111941 A1* | 8/2002 | Roux | G06F 16/3344 |
| 2003/0126561 A1* | 7/2003 | Woehler et al. | 715/531 |
| 2004/0183837 A1* | 9/2004 | Watanabe | G06F 17/30011 |
| | | | 715/853 |
| 2004/0220905 A1 | 11/2004 | Chen et al. | |
| 2004/0267779 A1* | 12/2004 | Carter | G06F 17/30731 |
| 2005/0108001 A1* | 5/2005 | Aarskog | 704/10 |
| 2005/0256889 A1* | 11/2005 | McConnell | G06F 16/288 |
| 2006/0015482 A1 | 1/2006 | Beyer et al. | |
| 2007/0033008 A1* | 2/2007 | Takuechi | G06F 17/2735 |
| | | | 704/10 |
| 2007/0033200 A1 | 2/2007 | Gillespie | |
| 2007/0055680 A1* | 3/2007 | Statchuk | G06F 17/30734 |
| 2007/0106662 A1* | 5/2007 | Kimbrough | G06F 17/30707 |
| 2007/0112554 A1* | 5/2007 | Goradia | G06F 17/2735 |
| | | | 704/4 |
| 2007/0208669 A1* | 9/2007 | Rivette | G06F 17/30011 |
| | | | 705/59 |
| 2008/0046486 A1* | 2/2008 | Huang | 707/205 |
| 2009/0113350 A1* | 4/2009 | Hibino | G06F 17/30061 |
| | | | 715/853 |

FOREIGN PATENT DOCUMENTS

| | | |
|---|---|---|
| WO | WO-9921110 A1 | 4/1999 |
| WO | WO-0049519 A1 | 8/2000 |
| WO | WO-2004086263 A2 | 10/2004 |

* cited by examiner

TERM-DRIVEN RECORDS FILE PLAN AND THESAURUS DESIGN

BACKGROUND

This invention relates to automated records management. Companies often have to comply with internal or external requirements to implement some kind of records management system. The records management system typically includes a file plan that hierarchically organizes all of the company's records and that links with the company's record retention schedule. To designate a document to become a record, the document has to be declared as a record and classified in accordance with the file plan.

After the document becomes a record, the document may go through a life cycle that consists of one or more phases. Each phase specifies a duration and denotes a records management activity that must be performed at the beginning or end of the phase. Retention rules associated with the record control how long the record will remain in the various phases. At the end of the record's life cycle, the record is disposed of.

As the skilled reader realizes, the file plan is the backbone of the records management system. Without the file plan, there would be no relational or taxonomic order into which the records could be sorted. Thus, it is very important to have a well-designed file plan that provides a clear taxonomy that makes it easy for users to correctly create records and classify documents. Typically, the file plan is created through a manual process, which is both time-consuming and error-prone, where a user among other things must construct a hierarchical structure into which the records can be sorted. Especially for large companies with large numbers of records and many departments and users, this may be a very daunting task. Thus, it would be desirable to have a simplified and improved process for generating file plans for records management systems.

SUMMARY

In general, in one aspect, the invention provides methods and apparatus, including computer program products, implementing and using techniques for generating a file plan and a thesaurus for a records management system. A first user input defining one or more top level terms to be used in the file plan is received. A second user input defining one or more child level terms to be used in the file plan for at least some of the top level terms is received. A third user input defining one or more term relationships among the collection of child level terms and the top level terms is received. Without further user input, a file plan and a thesaurus are generated based on the top level terms, the child level terms and the specified term relationships among the child level terms and top level terms.

Advantageous implementations can include one or more of the following features. The term relationships can be thesaural relationships that include one or more of: broader term relationships, narrower term relationships, and related term relationships. A test routine can be run on the input top level terms, the child level terms, and the one or more term relationships to identify inconsistencies in terms or term relationships, prior to generating the file plan and thesaurus. Receiving a first user input and receiving a second user input can include reusing at least one top level term or reusing at least one child level term from an existing thesaurus.

The first, second and third user input can be received through a wizard user interface that guides the user through a series of steps in which the first, second and third user inputs are received. A fourth user input can be received, which includes one or more of: a file plan title, a location of a repository where electronic documents corresponding to the records in the file plan are stored, and security and access control parameters for the file plan. Generating the file plan and thesaurus can include populating the top level terms and the child level terms into properties of file plan elements. Generating the file plan and thesaurus can include outputting the file plan and thesaurus in one of: a format that is specific to a particular records management system and an open format that can be used by multiple records management or other systems. Receiving a third user input defining one or more term relationships can include receiving a definition declaring the term relationship as one of: a filing relationship, and a descriptive relationship.

The invention can be implemented to include one or more of the following advantages. Easier and less error-prone file plan creation for records management systems is achieved. Logical and consistent naming and structure of entities according to the needs of the user is ensured. Flexible use and re-use of thesaural elements (i.e., terms and their relationships) is ensured when building new file plans, structuring the organization of content, or extending the functionality of current records management systems through thesaural or associative relationships. A core thesaurus can be built for each file plan, which allows the file plan to contain additional properties to enhance the naming of entities in the records management system, to control the terms used, and to enhance query functionality. The thesauri created in accordance with the various embodiments of the invention conform to the ISO2788 Standard for Development of Monolingual Thesauri.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Overview

The various embodiments of the invention described herein pertain to enhancements to file plan creation and maintenance techniques for records management systems. In particular, a processor tool, referred to herein as a Records Manager File Plan and Thesaurus Designer tool, or a designer tool for short, uses a wizard-like method to gather business and record terms and their relationships as input, provides a testing mechanism for verifying the relational logic between the records, and then automatically generates both a file plan and a thesaurus based upon the term relationships input by the user. The output from the processor tool is a new file plan and an associated thesaurus. Various embodiments of the invention will now be described by way of example and with reference to the drawings. In particular the following description will explain how a user interacts with the designer tool to create a new file plan and an associated thesaurus for an existing records management application.

System Overview

Figure 1:
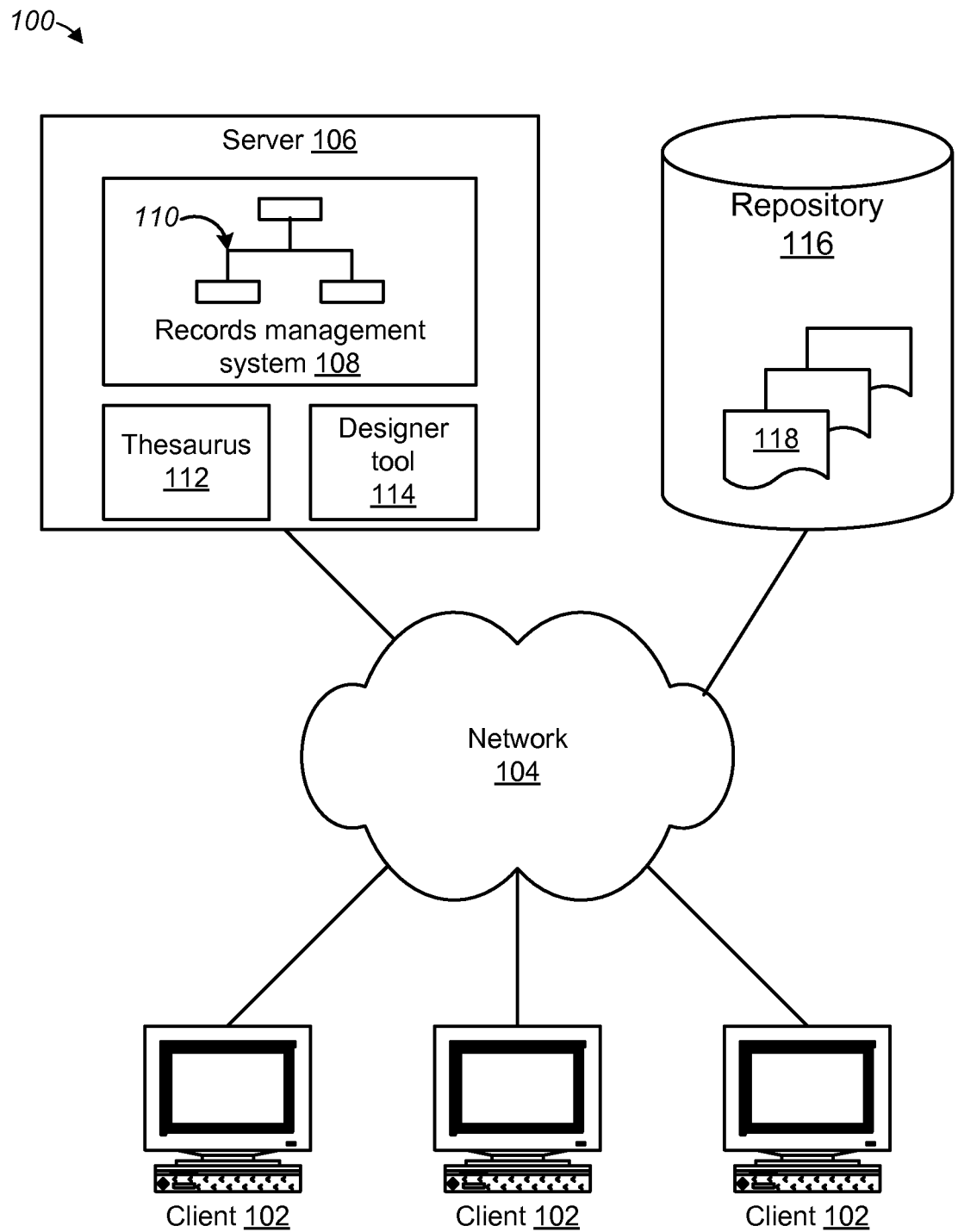
FIG. 1 shows a schematic block diagram of one embodiment of a system (100) in which the designer tool in accordance with the invention can be implemented.

FIG. 1 shows a schematic block diagram of a system (100) in which the designer tool in accordance with one embodiment of the invention can be implemented. As can be seen in FIG. 1, the system (100) includes several clients (102) that can access a records management system (108) residing on a server (106) through a network (104), such as a company's intranet, or the Internet, using conventional techniques. The records management system (108) includes, among other things, a hierarchical organization or the records (110). The records (110) in the records management system (108) contain information about electronic documents (118) stored in a repository (116). The electronic documents (118) in the repository (116) can also be accessed through the network (104). In some cases, the records (110) can also include information about physical documents that are stored in some physical location, such as a library or another type of archive. It should also be noted that although only a single repository (116) is illustrated in FIG. 1, in a real life scenario, there can be several repositories (116) that are connected to the network (104).

The server (106) also includes a thesaurus (112), which includes a list of authorized terms to be used for functional headings, file titles and/or indexing terms for the records management system (108). The role of the thesaurus (112) in the various implementations of the invention will be described in further detail below. Finally, the server (106) also includes a designer tool (114), which can be used to create a file plan for the records management system (108), and to create a thesaurus (112). The creation of the file plan and the thesaurus (112) will now be described in further detail with reference to FIG. 2.

File Plan and Thesaurus Creation

Figure 2:
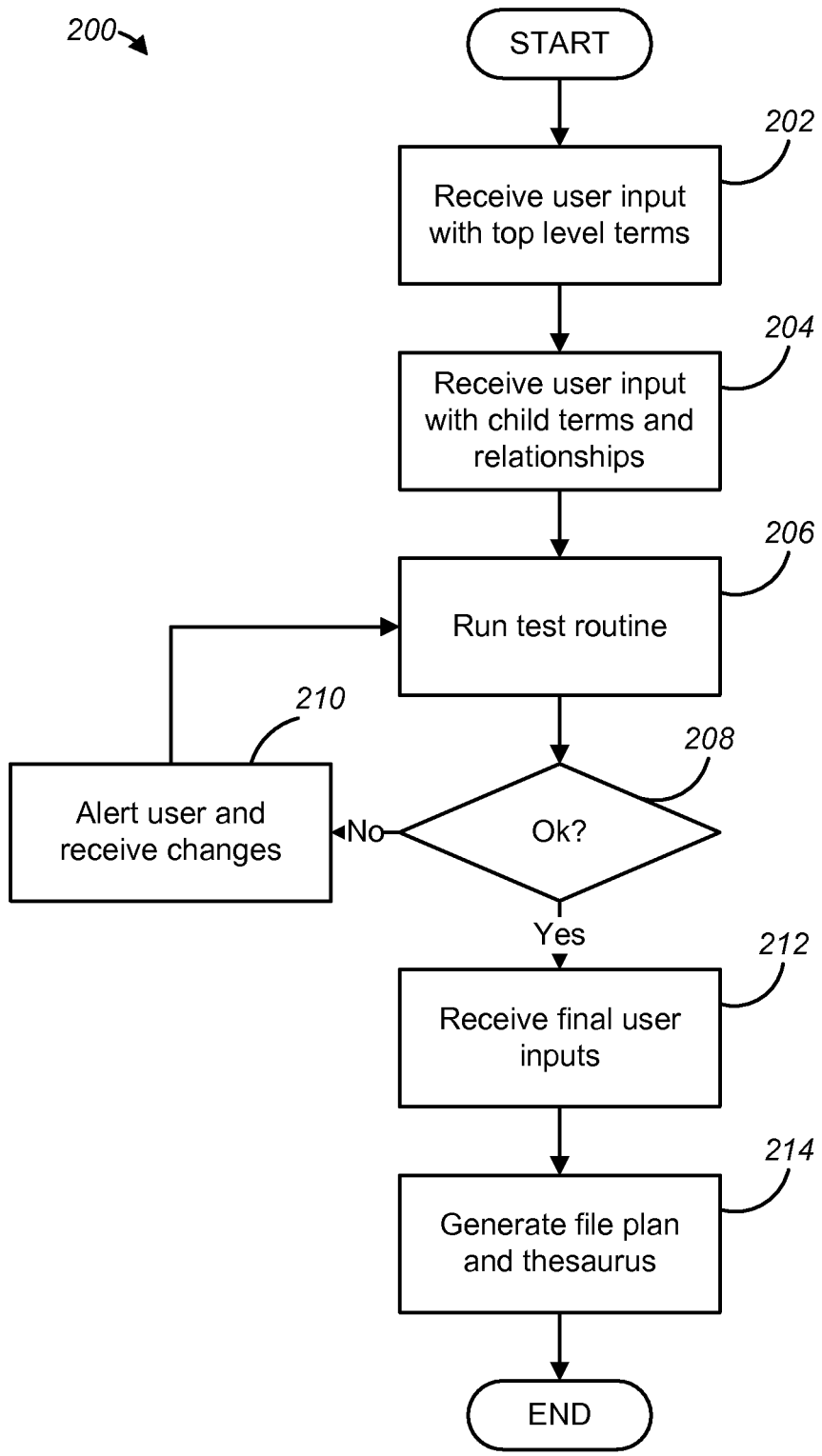
FIG. 2 shows a flowchart of a process (200) for generating a file plan and a thesaurus in accordance with one embodiment of the invention.

FIG. 2 shows a flowchart of a process (200) for generating a file plan and a thesaurus (112) in accordance with one embodiment of the invention. In some embodiments, the file plan and thesaurus generation is performed by the designer tool (114) residing on the server (106). However, as the skilled reader realizes, other embodiments are also possible. For example, the file plan and thesaurus generation can also be performed as a service on a remote server, to which the user submits data through a network (for example, through the Internet) and from which the user receives a file plan and thesaurus as a response, which can be stored on the server (106).

As can be seen in FIG. 2, the process (200) begins by receiving a user input that includes the top level (i.e., the most general) terms in the records relationship hierarchy (step 202). These top level terms can be functional, organizational, or even subject or topic terms that define filing hierarchies. An example of an organizational set of top level terms is different departments or divisions within a corporation, such as "Accounting," "Administration," "Finance," "Human Resources," "Operations," "Sales," and so on. In some embodiments these top level terms can be input by interacting with the designer tool (114) though a user interface that allows the user to enter the top level terms as a list of terms or through a series of dialog boxes, for example. As the skilled reader realizes, there is a variety of ways in which a user can input terms and the various embodiments of the invention described herein are not limited to a particular way of entering data.

Next, user inputs of child terms and relationships are received (step 204). The child terms are terms that form one or more children to each of the top level terms input in step 202. The child terms can be entered in similar ways to how the top level terms were entered in step 202. In some embodiments, for each child term that is entered, the user is given the option of defining a term relationship with other child terms or top level terms. These term relationships are links between terms that can describe synonyms, near-synonyms, or hierarchical relations. Synonyms and near-synonyms can be indicated by a related term (RT). The way the term "cybernetics" is related to the term "computers" is an example of such a relationship. Hierarchical relationships can be used to indicate terms which are narrower and broader in scope. A broader term (BT) is a more general term, for example "apparatus" is a generalization of "computers." Reciprocally, a narrower term (NT) is a more specific term, for example, "digital computer" is a specialization of "computer." BT and NT are reciprocals, that is, a broader term necessarily implies at least one other term which is narrower. The term relationships can be defined for the child terms and top level terms within the same top term hierarchy (e.g., "Sales"), or can extend to child terms of another top term hierarchy (e.g., "Finance") at any level.

In some embodiments, the user is presented with a finite list of term relationship options, such as a drop-down menu or a list of checkboxes giving the possible relationship types between the child terms. These relationships can be one-to-one (i.e., a term relationship is defined for a pair of terms) or one-to-many (i.e., a term relationship is defined by associating any number of terms as a group of terms and indicating the term relationship of the group to the top level term or to a horizontal term). Typically, there are no limits as to how many child terms and child term levels the user can enter, although in some cases a user may deem it to be wise to limit the number of levels for practical purposes, for example, in order to make the file plan more manageable and user-friendly.

In some embodiments, the user can indicate whether a term relationship is a filing relationship (that is, the term should become a node in the file plan) or whether the relationship is a descriptive relationship (that is, the term should become a thesaural property available when a record is entered or a file plan node is created), or both. This may be useful for reducing the complexity of a file plan, as the file plan might otherwise become very complex if all the defined relationships would result in the creation of a node in the file plan. Thus the possibility to indicate the type of relationship can extend the flexibility of the tool to create a thesaurus and file plan, as well as to create available properties (metadata), for records entered into the file plan.

When the entry of the child terms and their relationships is complete, a test routine is run (step 206). The test routine can be started in response to the user indicating that the input of top level terms and child terms is complete. The test routine goes through every entered term and relationship and identifies whether there are any logical problems or inconsistencies in the entered terms and relationships. If it is determined that not all the terms and/or relationships are logically correct and consistent (step 208), the user is alerted and is prompted to make the necessary changes (step 210), and the test routine is run again based on the changed user inputs (step 206).

If it is determined in step 208 that all the terms and term relationships are logically correct and consistent, the process continues to step 212 where a set of final user inputs are received. These final user inputs can include, for example, a file plan title and information pertaining to the repository (116) where the documents (118) associated with the file plan are currently stored or will be subsequently stored. In some embodiments, other types of information that is needed by the records management system (108) or the repository (116) is also provided by the user, such as, security and access control parameters.

When the final user inputs have been entered, the file plan and thesaurus are generated (step 214). During the generation, the processor conducts the operations necessary to build a file plan and thesaurus. The terms entered by the user in the previous steps form the basis of the thesaurus and are automatically populated into the properties of the file plan elements, such as categories, folders, volumes, and so on. For example, assume that the user entered three levels of terms in a term hierarchy; "Human Resources"-"Employment"-"Recruiting. On a record that is placed in the file plan under the lowest level ("Recruiting"), there would be three different properties. "Human Resources" would be a top term property value, "Employment" would be a child property value (or narrower term) of "Human Resources", and "Recruiting" would be a child term of "Employment." It should be noted that this description of properties is specific to the actual technology for which the designer tool (114) is designed to produce a file plan. Generically speaking, the designer tool (114) renders terms in the thesaurus (112) available for use in description and filing of records anywhere within the file plan, so that any record can make use of terms, either in accordance with the file plan node, or in accordance with the overall thesaurus (112), or in accordance with both the file plan node and the thesaurus (112). An example of this is that a term that is associated with a human resources personnel folder, but that is not associated with a legal file, can be available to describe a record placed within the legal file. This provides the system with the means to search and locate any content based on a term irrespective of where the term resides in the file plan, or even within an external system that is using the thesaurus (112).

At the end of the generation of the file plan and thesaurus (112), a confirmation is shown to the user, informing the user that the file plan and thesaurus (112) have been created and that the user may start entering records into the records management system (108). This ends the process (200).

In some embodiments, the user can select a format for the file plan and thesaurus that is output in step 214. For example, the user may be presented with a list of choices of existing records management system formats and be instructed to select one of the proposed formats. Alternatively, the file plan and thesaurus can be output in a general format, such as an Extended Markup Language (XML) format, that can be used by a wide range of records management systems (108), or other structured formats as may be applicable for the alternative use of the thesaural and file plan structure.

In some embodiments, the designer tool (114) can also be used to modify existing file plans and thesauri, whereas in other embodiments other specialized tools can be used for this purpose. For example, the designer tool (114) can be run to update an existing file plan and thesaurus (112) pair, in the event of bulk updates or additions to a file plan or thesaurus (112). The revision or modification of single relationships can be done within the records system (108) that has received the output of the designer tool (114).

In a typical real life scenario in a corporate environment, it is common to have more than one file plan, as a single hierarchy of terms may not be sufficient, especially when the corporation is large. For example, the finance department may have one file plan, while the engineering department has another file plan, and so on. In some embodiments of the invention, users can copy terms from an existing file plan when defining a new file plan using the process that was described above with reference to FIG. 2. Furthermore, the process also allows users to cross-reference terms between multiple different file plans. As a result, the entry of terms for a new file plan can be simplified, and at the same time a more consistent term use within a company can be achieved, even if there are multiple file plans within that company.

Some embodiments of the invention allow a subset of a single thesaurus (112) created by the designer tool (114) to be used in the creation and control of other file plans. That is, a single thesaurus (112) can be used to generate more than a single file plan, in a "hub and spoke"-like manner. For example, the designer tool (114) can allow a user to select a subset of terms and relationships to be used in creating a new file plan, from a set of terms and relationships that may already be used in a different part of the same large system, or that may be used in a different repository or system that has no technical similarity to the original records management system for which the original file plan was built. This allows a single central thesaurus (112) to serve as a "hub" around which multiple file plans can be created and controlled, which may be very advantageous.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A number of implementations of the invention have been described. Nevertheless, it will be understood that various modifications may be made without departing from the spirit and scope of the invention. For example, instead of a user inputting top level terms and child level terms in steps 202 and 204, as was discussed above, in some embodiments the tool can import an existing thesaurus (e.g., professional thesaurus), or parts thereof, with an acceptable structure and use this thesaurus as a basis for generating a file plan and thesaurus (112) for use with the records management system (108). Furthermore, the term relationships do not have to be logical relationships, but can also be, for example, translations between different languages. For example, an English term can be related with a "this means that" type of relationship to the Swedish equivalent of the term. The ability to define such "translational" relationships can facilitate use of the designer tool (114) and the records management system (108) in global organizations and corporations. Accordingly, other embodiments are within the scope of the following claims.

The invention claimed is:

1. A method for an automated electronic records management system on a server, the method comprising:
   verifying, by a computer processor, one or more relationships among two or more terms occurring in two or more records on the server;
   generating, by a designer tool residing on the server, a file plan and a thesaurus based on the two or more terms and the verified one or more relationships among the two or more terms; and
   organizing, by the computer processor, the two or more records hierarchically in the automated electronic records management system on the server in accordance with the file plan and the thesaurus generated by the designer tool; and
   linking, by the computer processor, the file plan and records to a records retention schedule for the automated electronic records management system.

2. The method of claim 1, wherein:
   the two or more terms include top level terms and child level terms, and
   the relationships include one or more of: broader term relationships, narrower term relationships, related term relationships, and descriptive term relationships.

3. The method of claim 1, wherein verifying one or more relationships comprises:
   running, by the computer processor, a test routine on the one or more relationships and the two or more terms to identify inconsistencies prior to generating the file plan and thesaurus.

4. The method of claim 1, wherein at least one or more terms from an existing thesaurus is used when generating the thesaurus.

5. The method of claim 1, further comprising:
   associating with the file plan one or more of: a file plan title, a location of a repository where documents corresponding to the one or more records organized in the file plan are stored, and access control parameters for the file plan.

6. The method of claim 1, wherein the generated file plan comprises file plan elements, each file plan element having a property, further comprising:
   populating, by the computer processor, the two or more terms into properties of file plan elements.

7. The method of claim 1, further comprising:
   outputting, by the computer processor, the generated file plan and the generated thesaurus in one of: a format that is specific to a particular type of records management system, and an open format that is usable by multiple types of records management systems or other systems.

8. A non-transitory computer program product for an automated electronic records management system on a server, comprising: a non-transitory computer readable storage medium having computer readable program code embodied therewith, the computer readable program code comprising: computer readable program code configured to verify, by a computer processor, one or more relationships among two or more terms occurring in two or more records on the server; computer readable program code configured to generate, by processor designer tool residing on the server, a file plan and a thesaurus based on the two or more terms and the verified one or more relationships among the two or more terms; computer readable program code configured to organize, by the computer processor, the two or more records hierarchically in the automated electronic records management system on the server in accordance with the file plan and the thesaurus generated by the designer tool; computer readable program code configured to link the file plan and records to a records retention schedule for the automated electronic records management system.

9. The non-transitory computer program product of claim 8, wherein: the two or more terms include top level terms and child level terms, and the relationships include one or more of: broader term relationships, narrower term relationships, related term relationships, and descriptive term relationships.

10. The non-transitory computer program product of claim 8, wherein the computer readable program code configured to verify one or more relationships comprises: computer readable program code configured to run, by the computer processor, a test routine on the one or more relationships and the two or more terms to identify inconsistencies prior to generating the file plan and thesaurus.

11. The non-transitory computer program product of claim 8, wherein at least one or more terms from an existing thesaurus is used when generating the thesaurus.

12. The non-transitory computer program product of claim 8, further comprising: computer readable program code configured to associate with the file plan one or more of: a file plan title, a location of a repository where documents corresponding to the one or more records organized in the file plan are stored, and access control parameters for the file plan.

13. The non-transitory computer program product of claim 8, wherein the generated file plan comprises file plan elements, each file plan element having a property, further comprising: computer readable program code configured to populate, by the computer processor, the two or more terms into properties of file plan elements.

14. The non-transitory computer program product of claim 8, further comprising: computer readable program code configured to output, by the computer processor, the generated file plan and the generated thesaurus in one of: a format that is specific to a particular type of records management system, and an open format that is usable by multiple types of records management systems or other systems.

15. A system for automated electronic records management comprising:

means for verifying, by a designer tool, one or more relationships among two or more terms occurring in two or more records;

means for generating, by the computer processor, a file plan and a thesaurus based on the two or more terms and the verified one or more relationships among the two or more terms;

means for organizing, by the computer processor, the two or more records hierarchically in the automated electronic records management system in accordance with the generated file plan and the generated thesaurus; and means for linking, by the computer processor, the file plan and records to a records retention schedule for the automated electronic records management system.

16. The system of claim 15, wherein:

the one or more terms include top level terms and child level terms, and the relationships include one or more of: broader term relationships, narrower term relationships, related term relationships, and descriptive term relationships.

17. The system of claim 15, wherein the means for verifying one or more relationships comprises:

means for running a test routine on the one or more relationships and the one or more terms to identify inconsistencies prior to generating the file plan and thesaurus.

18. The system of claim 15, wherein at least one or more terms from an existing thesaurus is used when generating the thesaurus.

19. The system of claim 15, further comprising:

means for associating with the file plan one or more of: a file plan title, a location of a repository where documents corresponding to the one or more records organized in the file plan are stored, and access control parameters for the file plan.

20. The system of claim 15, wherein the generated file plan comprises file plan elements, each file plan element having a property, further comprising:

means for populating the one or more terms into properties of file plan elements.

21. The system of claim 15, further comprising:

means for outputting the generated file plan and the generated thesaurus in one of: a format that is specific to a particular type of records management system, and an open format that is usable by multiple types of records management systems or other systems.

* * * * *